United States Patent Office 3,793,293
Patented Feb. 19, 1974

3,793,293
ELECTROPHOTOGRAPHIC COATING COMPOSITIONS HAVING BROMINE-CONTAINING POLYMER BINDERS
Dilip K. Ray-Chaudhuri, Somerville, Paul C. Georgoudis, Dunellen, and Hans H. Stockmann, Plainfield, N.J., assignors to National Starch and Chemical Corporation, New York, N.Y.
No Drawing. Filed Aug. 4, 1971, Ser. No. 169,075
Int. Cl. C08f *15/00, 15/16*
U.S. Cl. 260—47 UA                            3 Claims

ABSTRACT OF THE DISCLOSURE

Photoconductive coating compositions for application to solid substrates which are to be utilized in electrophotographic operations are described; the resultant photoconductive coatings comprise a layer of photoconductive pigment particles bonded to themselves and to the solid substrate with a binder comprising a novel interpolymer, at least one of whose constituent monomers contains bromine. Novel bromine-containing monomers are also disclosed.

BACKGROUND OF THE INVENTION

This invention relates to new photoconductive coating compositions, and more particularly to such compositions comprising polymeric binders derived from bromine-containing monomers and to the improved photoconductive coatings prepared from such compositions.

In the known electrophotographic processes, a solid substrate which has been coated with a photoconductive surface is electrostatically charged in the absence of light. The charged surface is then exposed to a light source, such as an image reflected from a printed surface or transmitted through a transparency, which serves to discharge the exposed area while having no effect upon the charge on the unexposed areas which is thus retained in the form of an electrostatic image. The surface areas are then contacted with an electrostatically charged marking powder or dispersion which clings to the charged areas but does not adhere to the uncharged, i.e. exposed, areas. The visible image which is thus formed may then be transferred to another surface resulting in a positive or negative print, or, if desired, it may be fused in order to fix the image directly to the solid substrate itself.

It is evident that the proper selection of a photoconductive system is essential for a successful electrophotographic operation. Among the properties that must be exhibited by such photoconductive materials are included: the ability to accept an electrostatic charge; the ability to hold the charge for a period of time in the absence of light without exhibiting a rapid rate of charge decay; the ability to provide the fixed or developed sheets with excellent print density; the ability to provide an efficient dispersing medium for the pigment particles; inertness of the binder toward the pigment which is being utilized; and, the ability to be readily coated on a solid substrate.

A frequently utilized photoconductive system comprises the combination of a zinc oxide pigment and polyvinyl acetate or a styrene interpolymer binder. These systems, however, do not exhibit the aforementioned properties to an optimum level.

It is recognized in the art that the properties of an electrophotoconductive system are realized not only from the particular photoconductive pigment which is utilized; rather, it is the combination of the pigment with a particular binding agent which is the critical factor. It can be understood, therefore, that the choice of a binding agent in connection with a pigment, such as zinc oxide, is of prime importance in achieving the desired characteristics of the system.

We have now found that photoconductive coatings comprising a photoconductive pigment, such as zinc oxide, bonded with a binding agent comprised of an interpolymer derived from at least one bromine-containing monomer realize the above described requirements for achieving an effective electrophotographic system having desirable characteristics. A particular feature of the present electrophotoconductive compositions is their ability to discharge their electrostatic charge almost instantaneously in the presence of light. Thus, we have found that solid substrates which have been coated with the latter material will accept and hold an electrostatic charge in the absence of light, and upon being exposed to light will immediately release the charge from the exposed areas but will retain the charge on the unexposed areas with a high degree of efficiency and for a period of time sufficient to permit visible development of the electrostatic image formed by the unexposed areas. Furthermore, these photoconductive systems are readily coated onto a variety of solid substrates and provide the resulting printed sheet with excellent density, i.e. with excellent definition of the visible image.

SUMMARY OF THE INVENTION

It is, thus, the object of this invention to provide a photoconductive system which has the ability to accept and retain an electrostatic charge for a period of time which is sufficient to permit visible development and fixation of an electrostatically formed image and which is, therefore, readily applicable for use in electrophotographic operations. It is a further object to prepare base plates for use in electrophotographic operations by coating the latter photoconductive system onto applicable solid substrates. Various other objects and advantages of this invention will be apparent from the following description thereof.

The polymeric binder system which is utilized in conjunction with the photoconductive pigment serves to bind the particles of the latter pigment to themselves as well as to the selected substrate. It thereby places these pigment particles in a spatial relationship with one another such that they are rendered photoconductive in those areas in which light radiation strikes the coating.

The novel binders of this invention are interpolymers comprised of residues derived from at least one bromine-containing monomer selected from the group consisting of compounds of the following general formulas:

(a) $$CH_2=C-COO-CH_2-C=CH-Br$$
    with $R_1$ above left C and Br above right C (b) $$CH-COO-CH_2-C=CH-Br$$
    $$CH-COO-Y \quad Br$$

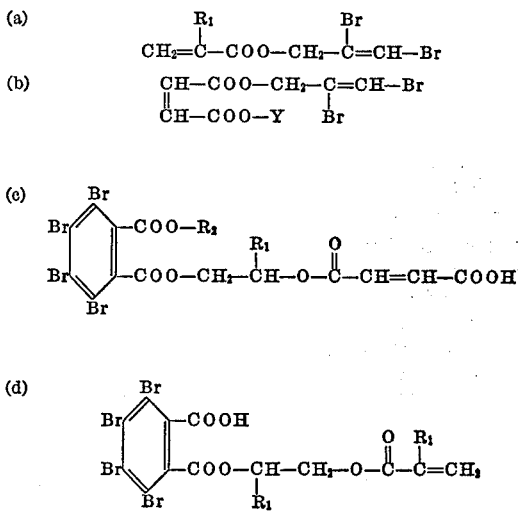

(c)

(d)

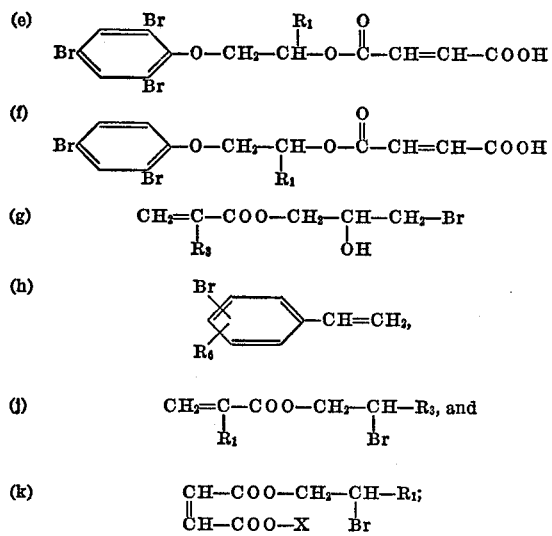

wherein:
$R_1$=H, or —$CH_3$,
$R_2$=alkyl radical having 1 to 4 carbon atoms,
$R_3$=H, $CH_3$, or —$CH_2Br$,

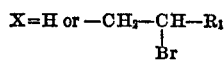

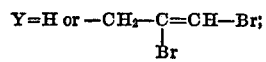

$R_6$=H or Br;

and at least one monomer which does not contain bromine selected from the group consisting of monomers having the following general formulas:

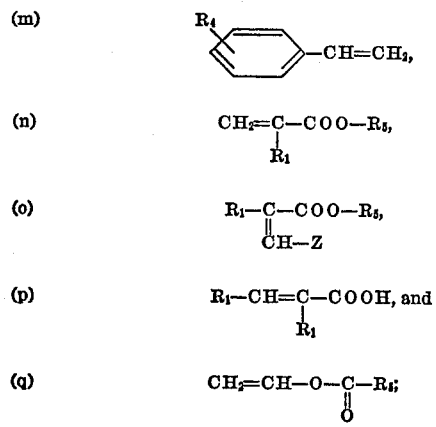

wherein:
$R_4$=H, Cl, or t-butyl,
$R_5$=an alkyl radical of 1 to 8 carbon atoms or a cycloalkyl radical of 3 to 8 carbon atoms, and
Z=H or —COO—$R_5$.

Esters of the above-listed acids are also useful monomers. The interpolymers of this invention contain about 0.01 to 0.35 mole of bromine-containing monomer per mole of total monomers.

The random interpolymers of this invention may be prepared by means of free radical initiated polymerization procedures or by other polymerization procedures well known to those skilled in the art. Generally, they are most conveniently prepared by means of free radical initiated solution polymerization techniques and they may then be used in the form of the organic solutions in which they were originally prepared. Alternatively, they may be prepared as 100% resin solid materials, as by means of a bulk or pearl polymerization procedure, and subsequently dissolved in organic solvents prior to their use as binders in our photoconductive coating composition. These interpolymers may also be prepared using emulsion polymerization techniques well known to those skilled in the art.

DESCRIPTION OF THE PREFERRED EMBODIMENTS

Although all of the bromine-containing monomers listed above are useful in preparing the improved binders of this invention the following monomers are preferred: 2-bromoethyl methacrylate, 2-bromoethyl maleate, ethyleneglycolmonomaleate - 2 - carboethoxy-3,4,5,6-tetrabromobenzoate, propyleneglycolmonomaleate - 2 - carboethoxy-3,4,5,6-tetrabromobenzoate, ethyleneglycolmonomaleate-2-carbobutoxy-3,4,5,6-tetrabromobenzoate, and propyleneglycolmonomaleate - 2 - carbobutoxy - 3,4,5,6-tetrabromobenzoate.

Of the monomers useful in preparing the novel polymers of this invention those of the types (a), (b), (c), (d), (e), and (f) are themselves novel.

Monomers of type (a) are prepared by the esterification of acrylic or methacrylic acid with 2,3-dibromoallyl alcohol following the conventional method of esterification. 2,3-dibromoallyl alcohol is prepared by adding 1 mole of bromine across the triple bond of propargyl alcohol in chloroform at 5 to 15° C. The brominated alcohol is then distilled under reduced pressure to obtain a pure product.

Monomers of type (b) are prepared by the reaction of 1 mole of maleic anhydride and 1 mole of 2,3-dibromoallyl alcohol at 80 to 100° C. using 0.1 to 0.5% triethylamine or sodium acetate as a catalyst. The final product is almost colorless viscous product having an acid number close to theory.

A typical monomer of the (c) type may be synthesized as follows in a mixture with a monoalkyl maleate or in pure form. The monomer is easier to synthesize in a mixture with 50 mole percent of monoalkyl maleate. It can also be synthesized in 100% purity by isolating the intermediate hydroxyalkyl alkyl tetrabromophthalate from the mixture in the second step of the reaction shown below and then reacting it with maleic anhydride.

The synthesis of monomer mixed with monoalkyl maleate may be described by the following sequence of reactions.

(I) 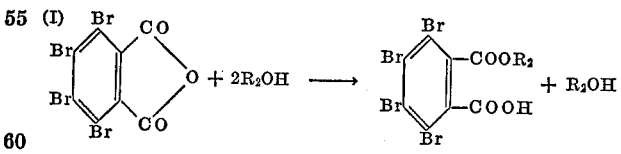

(II) 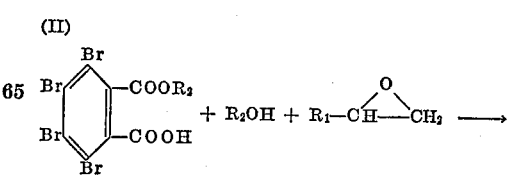

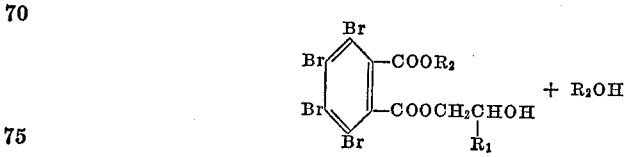

(III)

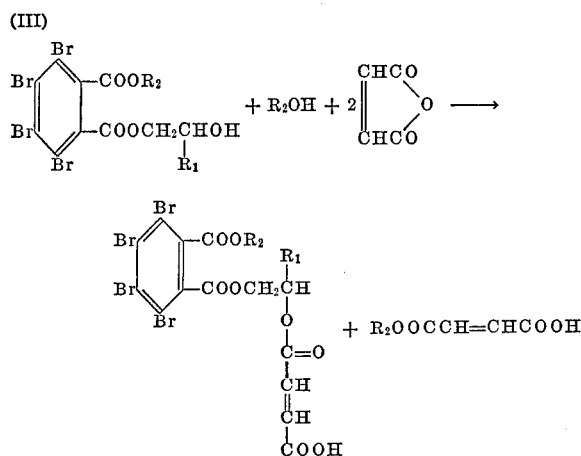

In the first reaction one mole of tetrabromophthalic anhydride is reacted with 2 moles of alkanol at 70 to 100° C. for 2 to 4 hours to form one mole of monoalkyl tetrabromophthalate and one mole of unreacted alkanol. In the second step this mixture is reacted with alpha olefin oxide such as ethylene oxide and propylene oxide, at 70–100° C. in a closed reactor or at atmospheric pressure for 2 to 4 hours in the presence of 1 to 3% (based on the mixture) tetramethylammonium chloride as a catalyst to form one mole of hydroxyalkyl alkyl tetrabromophthalate and one mole of unreacted alkanol. In the final step the above mixture is reacted with 2 moles of maleic anhydride at 70 to 100° C. to form one mole of alkyleneglycolmonomaleate - 2 - carboalkoxy-3,4,5,6-tetrabromobenzoate and one mole of monoalkylmaleate. The above monomer mixture is obtained as a slightly hazy, viscous liquid.

The 100% pure monomer is prepared by isolating the intermediate from the mixture obtained in the second step. The unreacted alkanol is removed by distillation under reduced pressure followed by washing the solution of intermediate in aromatic hydrocarbon solvent with water. A higher alkanol such as butanol requires thorough washing with water due to its low solubility in water. The washed intermediate is dried with a drying agent, stripped of solvent under reduced pressure at 25–50° C., and then reacted with one mole of maleic anhydride to form a pure alkyleneglycolmonomaleate-2-carboalkoxy-3,4,5,6-tetrabromobenzoate as a viscous liquid.

Monomers of type (d) are synthesized by the reaction of one mole of tetrabromophthalic anhydride and 1.25 to 2 moles hydroxyalkyl acrylate or hydroxyalkyl methacrylate at 80 to 100° C. for 3 to 6 hours using 1 to 5% (based on total charge) triethylamine as a catalyst. The mixture is then diluted with solvent (toluene, chloroform, methylenechloride, etc.) and washed with water several times to remove unreacted hydroxyalkyl acrylate or methacrylate and triethylamine. The washed monomer is dried with a drying agent (anhydrous sodium sulfate) and stripped of solvent under reduced pressure at 40–50° C. The finished monomer is obtained as a slightly colored viscous liquid having an acid number close to theory.

Monomers of type (e) are prepared by the reaction of 2,4,6-tribromophenol with an alphaolefin oxide such as ethylene oxide and propylene oxide, in the presence of 1 to 3 percent tetramethylammonium chloride at 80 to 100° C. for 3 to 6 hours to form 2,4,6-tribromophenoxyethanol. The reaction mixture is washed thoroughly with water after dissolving in solvent, dried with a drying agent, and stripped of solvent under reduced pressure at 40 to 60° C. The product is then analyzed for hydroxyl number. The yield of this intermediate is generally 40 to 60%. The intermediate is then reacted with maleic anhydride at 80 to 100° C. for 3 to 5 hours to form mono-2,4,6-tribromophenoxyethyl maleate.

The monomer is obtained as a slightly colored viscous liquid.

Monomers of type (f) can be synthesized using the same procedure as is used for monomers of type (e) by replacing tribromophenol with dibromophenol.

Preferred monomers which do not contain bromine and are useful in preparing the photoconductive polymers of this invention are: styrene, dibutylfumarate, dibutylmaleate, ethylacrylate, butylacrylate, hydroxypropylmethacrylate, hydroxyethylmethacrylate, hydroxypropyl acrylate, hydroxyethyl acrylate, vinylacetate, monoethylmaleate, monobutylmaleate, acrylic acid, methacrylic acid, and crotonic acid.

All of the interpolymers used in the binder compositions described herein may be prepared by means of free radical intiated polymerization procedures or by other polymerization procedures well known to those skilled in the art. However, they are most conveniently prepared by means of free radical initiated solution polymerization techniques and they may be then used in the form of the organic solvent solutions in which they were originally prepared. Alternatively, they may be prepared as 100% resin solids material, as by means of a bulk or pearl polymerization procedure, and subsequently dissolved in organic solvents prior to their use as binders in our photoconductive coating compositions. Organic solvents which may be employed for the solution polymerization of these interpolymers as well as for their ultimate use in formulating our photoconductive coating compositions include benzene, toluene, xylene, cyclohexane, ethyl acetate, isopropyl acetate, methyl ethyl ketone and methyl isobutyl ketone as well as mixtures of any of the latter solvents. Typical organic solvent solutions of these interpolymers, as used in preparing our photoconductive coating compositions, should have a resin solids content of up to about 70%, by weight.

These interpolymers may also be prepared using emulsion polymerization techniques well known to those skilled in the art.

It is to be understood that although zinc oxide will ordinarily be utilized as the photoconductive pigment component of our novel compositions, it may, however, be replaced with various equivalents therefor, such for example, as titanium dioxide, selenium oxide, zinc sulfide, and the like. Moreover, a mixture of more than one photoconductive pigment may likewise be used.

The actual preparation of the novel photoconductive coating systems of this invention may be accomplished merely by admixing and dispersing the photoconductive pigment in an organic solvent solution of the selected interpolymer and thereafter finely grinding the resulting dispersion in any suitable equipment, such as a porcelain ball mill, Morehouse mill, kady mill, or sand mill, to a pigment particle size of from about 4 to 6 units on the Hegman scale.

Approximately from about 2 to 12 parts, by weight, of zinc oxide solids should be present in the mixture for each part, by weight, of the interpolymer resin solids. We have found that the total solids content, i.e. the combined weight of the pigment solids and the interpolymer solids, of our photoconductive coating compositions may vary from about 30 to 60% by weight. Appropriate dilution, when necessary, can be made using any one or more of the organic solvents described hereinabove.

The preparation is generally completed by incorporating a sensitizer dye or dye mixture into the coating composition in a concentration ranging from about 0.02 to 0.50%, based on the weight of the zinc oxide. Applicable sensitizers include, for example, disodium fluorescein, Rose Bengal, Bromphenol Blue, Methylene Blue, Eriochrome Black, Eosin Y, and Acridine Orange. The addition of the latter sensitizers may, however, be obviated if the resulting photoconductive systems are to be utilized in a procedure whereby the light or energy source is itself capable of causing a conductive response in the zinc oxide photoconductive pigment.

Optional additives may be incorporated into these novel photoconductive systems in order to modify certain properties thereof. Among such additives are included: plasticizers such as dialkyl phthalates; optical brighteners such as titanium dioxide; silicones; and, modifying resins such as alkyd resins.

Our novel systems may be coated onto a wide variety of solid substrates such, for example, as paper, paperboard, fabrics made from natural and synthetic fibers, metallic coated paper, metallic foils, and synthetic resin-based films such as polyethylene terephthalate, polyethylene, polypropylene, polyvinyl chloride and cellulose acetate, the latter resin-based films having previously been rendered conductive or semi-conductive. The actual application of these photoconductive systems to the selected substrate may be accomplished by the use of any technique which is capable of depositing a continuous film on the surface thereof. Thus, among the various methods of application which may be utilized, one may list wire wound land grooved rod applicaors, as well as air knife, trailing blade, gravure, reverse and direct roll coaters. Typical coating weights may range from about 8 to 30 pounds per 3000 square feet of substrate.

Following their application, the photoconductive coating systems are dried by any convenient means as, for example, by the use of forced air oven drying, infra-red or radiant heat drying. Here again, such drying methods are well known and the practitioner may employ the drying means best suited to his particular needs in light of the equipment which is available.

In order to demonstrate the excellent photoconductive properties exhibited by the coating systems of this invention, the tests described hereinbelow may be used. In each instance, these tests were conducted in an environment wherein the relative humidity was at a level of 50%.

Charge Acceptance: The selected photoconductive coating system is applied onto a paper substrate in a coating weight of 14 pounds per 3000 square feet of paper and then dried. Thereafter, the coated paper is conditioned, in the absence of light, for a period of 24 hours whereupon it is exposed, while still in the dark, to an electrostatic charging unit for a period of 7 seconds. The surface charge which is thus imparted to the coated paper is then measured by means of an electrostatic probe.

Dark Decay Rate: Continuing the procedure of the "Charge Acceptance" test, immediately after removing the charging unit and measuring the deposited surface charge, the electrostatic probe is utilized to measure the rate at which the charge dissipates from the surface of the coated paper by measuring the surface charge for a period of 10 seconds. Needless to say, photoconductive systems which exhibit a low dark decay rate, i.e. in the range of about 2 to 8 volts/second, are preferred for use in electrophotographic operations.

Light Decay Rate: On completing the "Dark Decay Rate" the electrostatic probe is utilized to measure the rate at which the charge dissipates from the surface of the coated paper when it is exposed to a light having an intensity of 16 foot-candles. The rapidly decreasing voltage is mechanically recorded on a revolving drum recorder the speed of which is held constant for a series of samples. The light decay rate is expressed in terms of the angle at the abscissa which is obtained when the light decay rate, as expressed in terms of the voltage, is plotted against time where time is plotted along the abscissa and voltage is plotted along the ordinate. Thus, a sample which had an instantaneous discharge would, of course, display a 90° angle. Inasmuch as the speed of the recording drum itself affects the plot of the discharge curve and thereby the angle obtained with respect to time, the "Light Decay Rate" of a particular sample is a value which is relative to a control sample which is run under identical conditions.

The following examples will fully describe embodiment of this invention. All parts given are by weight unless otherwise noted.

EXAMPLE I

This example describes the synthesis of 1:1 (mole) mixture of a new bromine-containing monomer, ethyleneglycol monomaleate - 2 - carbobutoxy-3,4,5,6-tetrabromobenzoate, and monobutyl maleate.

Tetrabromophthalic anhydride (232.0 parts), n-butanol (72 parts), and sodium acetate (1.07 parts) were charged into a closed stainless steel reactor equipped with a mechanical stirrer, a thermometer and a gas inlet tube. The reactants were heated to 90–95° C. and maintained at this temperature for 2 hours to form 1:1 (mole) of monobutyl tetrabromophthalate and n-butanol which had an acid number of 94.3. The infrared spectrum of the mixture showed complete disappearance of anhydride absorption bands at 5.4 and 5.6 microns. The temperature of the reactor was then lowered to 70–75° C. and thereafter tetramethyl ammonium chloride (2.7 parts) was charged into the reactor. Thereafter ethylene oxide was added slowly through the gas inlet tube over a period of 2 hours and the reaction was continued for an additional hour at the same temperature. The product which was a 1:1 (mole) mixture of butyl hydroxyethyl tetrabromophthalate and n-butanol, showed an acid number of 0.1. Finally, maleic anhydride (98 parts) was added to the mixture and temperature was raised to 80° C. The reaction was allowed to proceed for 2 hours. The completion of the reaction was followed by the disappearance of anhydride absorption bands of maleic anhydride at 5.4 and 5.6 microns. The final product, which was obtained as an almost colorless viscous liquid, had an acid number of 130 and contained 37.2% of bromine.

EXAMPLE II

This example describes the synthesis of the pure bromine containing monomer, ethylene glycol monomaleate-2-carboethoxy-3,5,6-tetrabromobenzoate.

Step I.—Synthesis of ethyl hydroxyethyl tetrabromophthalate intermediate

Tetrabromophthalic anhydride (580 parts), ethanol (143.5 parts), and sodium acetate (2.66 parts) were charged into the same type of reactor as described in Example I and heated to 80° C. for 1½ hours. The acid number of the product, which was a 1:1.25 (mole) mixture of monoethyl tetrabromophthalate and excess ethanol, was 96.2. The temperature of the reactor was lowered to 70° C. and thereafter tetramethylammonium chloride (5.86 parts) was charged into the reactor. Thereafter ethylene oxide (73.2 parts) was added slowly through the gas inlet tube over 2 hours. The reaction was continued for an additional hour for completion. The acid number of the product which was a 1:1.25 (mole) mixture of ethyl hydroxyethyl tetrabromophthalate and excess ethanol, was 0.2. Excess ethanol was then removed by washing with water and the product, ethyl hydroxyethyl tetrabomophthalate, was obtained as a white powder after filtration and drying at 40° C. under vacuum for 24 hours. The acid number and melting point of the product were 0.173 and 118–121° C. respectively.

Step II.—Reaction of above intermediate with maleic anhydride

Ethyl hydroxyethyl tetrabromophthalate (138.5 parts) and maleic anhydride (24.5 parts) were charged into a multiple neck flask fitted with a glass-sealed stirrer, a thermometer and a condenser fitted with a drying tube.

Reactants were heated to 85–90° C. and allowed to react at this temperature for about 6 hours. The viscous product was then crystallized from vinyl acetate as a white powder having a M.P. 80–84° C., and acid number 88.0, and containing 49.8% of bromine.

EXAMPLE III

This example describes the synthesis of pure ethyleneglycol monomaleate - 2 - carbobutoxy-3,4,5,6-tetrabromobenzoate.

Step I.—Synthesis of butyl hydroxyethyl maleate

The synthesis of the above intermediate mixed with n-butanol in 1:1 mole ratio has already been described in Example I. Unreacted n-butanol was removed by washing the benzene solution of the mixture with water 4 to 5 times. The washed material was dried over anhydrous sodium sulfate, filtered, and benzene solvent was stripped off under vacuum at 40–50° C. The intermediate, butyl hydroxyethyl maleate, was obtained as a colorless viscous liquid having an acid number zero.

Step II.—Reaction of butyl hydroxyethyl tetrabromophthalate with maleic anhydride Butyl hydroxyethyl tetrabromophthalate (198 parts), maleic anhydride (32.65 parts) and sodium acetate (2.3 parts) were charged into the same type of flask as used in Step II of Example II. Reactants were heated to 80° C. and allowed to react at this temperature for about 6½ hours. The product was obtained as a viscous mass having an acid number 88.8, which is slightly higher than the theoretical value, and containing 46.5% of bromine.

EXAMPLE IV

This example describes the synthesis of mono-2,4,6-tribromophenoxyethyl maelate.

Step I.—Synthesis of 2,4,6-tribromophenoxy ethanol intermediate 2,4,6-tribromophenol (94.9 parts), ethylene oxide (14.7 parts) and tetramethylammonium chloride (2.0 parts) were charged into the same type of reactor as described in Example I. Reactants were heated to 95–100° C. over 2½ hours and allowed to react at this temperature for an additional 4½ hours for the completion of reaction. The product was then dissolved in benzene, washed with water three times, dried with anhydrous sodium sulfate, filtered, and benzene stripped off under vacuum at 40° C. The final product was a slightly colored pasty material having a hydroxyl number of 150.

Step II.—Reaction of above intermediate with maleic anhydride 2,4,6-tribromophenoxy ethanol (37.5 parts), maleic anhydride (9.8 parts), and triethylamine (0.1 part) were charged into the same type of flask as described in Step II of Example II. Reactants were then heated to 80° C. and allowed to react for about 9 hours. The product was then dissolved in toluene, washed with water 4 times, dried over anhydrous sodium sulfate, filtered, and toluene stripped off under vacuum at 40–50° C. The final monomer was obtained as a slightly colored viscous material having an acid number 110 and containing 51.0% of bromine.

When the dibromo compound is used parallel results are obtained.

EXAMPLE V

This example describes the synthesis of 2,3-dibromoallyl maleate.

Step I.—Synthesis of 2,3-dibromoallyl alcohol

Propargyl alcohol (42 parts) was charged into a multiple neck flask fitted with a glass-sealed stirrer, a dropping funnel, a thermometer and a condenser fitted with a drying tube. Bromine (120 parts) dissolved in methylene chloride (80 parts) was added slowly over a period of 2 hours while the mixture was kept at 5 to 8° C. The reaction was allowed to continue for an additional hour at the same temperature. Methylene chloride was then stripped off under reduced pressure at 40° C. and the crude alcohol thus obtained was distilled under vacuum (10 mm.) at 97.5 to 100° C. The $N_D^{25°\ C.}$ was 1.5789.

Step II.—Reaction of 2,3-dibromoallyl alcohol with maleic anhydride 2,3-dibromoallyl alcohol (21.6 parts), maleic anhydride (12.25 parts) and triethylamine (0.05 part) were charged into a flask fitted with a glass-sealed stirrer, a thermometer and a condenser fitted with a drying tube. The reaction mixture was heated at 94–97° C. for 5 hours. The product was then dissolved in toluene (100 parts), washed 4 times with water, dried over anhydrous sodium sulfate, filtered, and toluene stripped off under vacuum at 40 to 50° C. The final product was a low melting white solid having an acid number 170. The acid number was slightly lower than the theoretical value (178.6). The product contained 51.5% bromine.

EXAMPLE VI

This example describes the synthesis of 2,3-dibromoallyl methacrylate.

2,3-dibromoallyl alcohol (100 parts), methacrylic acid (86 parts), concentrated sulfuric acid (1.94 parts), methoxy hydroquinone (1.94 parts), and toluene (50 parts) were charged into a flask fitted with a glass-sealed stirrer, a thermometer, and a Dean and Stark apparatus fitted with a condenser. The mixture was heated to reflux and the theoretical amount (8.3 ml.) of water was collected over a period of 3 hours. The mixture was then diluted with ether (200 parts), washed with water and dilute (3%) sodium hydroxide solution to remove excess methacrylic acid and sulfuric acid, dried over anhydrous sodium sulfate, filtered and solvent stripped off. The fraction was collected at 65–83.5° C. at 1.25–1.88 mm. Hg. The monomer was characterized by infrared spectrum and saponification measurements and was found to be 99% pure. It contained 41.7% bromine.

EXAMPLE VII

This example described the synthesis of methacryloxyethyl mono-tetrabromophthalate.

Tetrabromophthalic anhydride (139 parts), 2-hydroxyethyl methacrylate (64.4 parts), and triethylamine (5.4 parts) were charged into a flask fitted with a glass-sealed stirrer, a thermometer and a condenser fitted with a drying tube. The mixture was heated to 80–85° C. and the reaction allowed to continue for 6 hours. The mixture was cooled and diluted with toluene (200 parts), washed three times with water, dried over sodium sulfate, filtered and stripped of toluene under vacuum at 40–50° C. using air bleed as an inhibitor. The monomer was recovered as a viscous mass which on standing for a week solidified. The M.P. and acid number of the solid monomer were 220–225° C. and 99 respectively. It contained 52.8% bromine.

EXAMPLES VIII–XII

These examples describe the synthesis of additional bromine containing monomers such as mono-2-bromoethyl maleate (Example VIII), 2-bromoethyl methacrylate (Example IX), mono-2,3-dibromopropyl maleate (Example X), 2,3-dibromopropyl methacrylate (Example XI) and 2,3-dibromopropyl acrylate (Example XII). In Examples VII and X the monomer was purified by washing with heptane; in Examples IX, XI, and XII the monomer was purified by distillation under vacuum. The syntheses are summarized in Table I.

TABLE I

| Ingredients | VIII | IX | X | XI | XII |
|---|---|---|---|---|---|
| 2-bromoethanol (parts) | 65.6 | 75 | | | |
| 2,3-dibromopropanol (parts) | | | 458 | 218 | 436 |
| Maleic anhydride (parts) | 40.9 | | 196 | | |
| Methyl methacrylate (parts) | | | | 400 | |
| Methacrylic acid (parts) | | 103 | | | |
| Acrylic acid (parts) | | | | | 288 |
| Methoxy hydroquinone (parts) | | 5.3 | | | 21.7 |
| N-phenyl-2-naphthylamine (parts) | | | | 28 | |
| Benzene (parts) | | 35.6 | | | 50 |
| Aluminum isopropoxide (parts) | | | | 28 | |
| Sulfuric acid (parts) | | | 0.9 | | 7.2 |
| Triethylamine (parts) | 0.1 | | 0.6 | | |
| Reaction time (hours) | 5½ | 4½ | 5½ | 16½ | 4 |
| Reaction temperature (° C.) | 80-81.5 | 121-125 | 80-102 | 100-140 | 89-124.5 |
| Yield (percent) | 90 | 87 | 92 | 18 | 48 |
| Bromine (percent) | 35.6 | 41.3 | 50.8 | 56 | 59 |
| Melting point (° C.) | 122-124 | | 96.5-97.5 | | |
| Boiling point (° C.) | | [1] 95-98.5 | | [1] 100-114 | [2] 92.5-95.5 |
| Acid number | 251 | | 176 | | |

[1] At 0.5 mm. Hg.
[2] At 20 to 25 mm. Hg.

EXAMPLE XIII

This example describes the synthesis of 3-bromo-2-hydroxypropyl acrylate.

Acrylic acid (72 parts) and tetramethyl ammonium chloride (2.9 parts) were charged into a flask fitted with a glass-sealed stirrer, a thermometer, a dropping funnel and a condenser fitted with a drying tube. Epibromohydrin (137 parts) was slowly added from the dropping funnel over a period of 5 hours while the reaction was continued for an additional hour after the slow addition. The progress of the reaction was followed by the disappearance of acidic carbonyl absorption band and at the same time appearance of ester carbonyl absorption band in the infrared spectrum. The acid number of the final product was about 0.5 and bromine content 79.9%.

EXAMPLE XIV

This example describes the synthesis of a 1:1 (mole) mixture of propyleneglycol monomaleate-2-carbobutoxy-3,4,5,6-tetrabromobenzoate and monobutyl maleate.

The process of synthesis of the above monomer was similar to that described in Example I, except that propylene oxide (62.5 parts) was used instead of ethyleneoxide. The mixed monomer was obtained as a viscous product having an acid number of 130 and a bromine content of 37.1%.

EXAMPLE XV

This example illustrates the preparation of a random interpolymer of styrene, dibutylfumarate (DBF), and the monomer mix of Example I.

Ingredients: Parts
Styrene _____ 135.20
Dibutyl fumarate _____ 171.00

A.

Monomer mix. of Ex. I _____ 70.40

B.

Toluene _____ 66.00
Benzoyl peroxide _____ 3.80

C.

Toluene _____ 96.00
Benzoyl peroxide _____ 7.50

D.

Toluene _____ 214.6

A and B were charged into a reactor equipped with a mechanical stirrer, nitrogen sparger, addition funnel and condenser. After degassing and sparging with nitrogen six times, the system was maintained under nitrogen atmosphere and the temperature of the mixture was raised slowly over a period of 1½ hours at 85-90° C. and held there for an hour. Solution C was added in four equal portions at one hour intervals. When the last portion had been added, the reaction was allowed to proceed two additional hours at 95° C., after which time D was added and the product cooled to room temperature. Conversion—98%; color—colorless, slightly hazy; acid number—25 and I.V. in toluene—0.12 dl./g.

EXAMPLE XVI

This example illustrates the preparation of a typical photoconductive coating system of this invention as well as the excellent properties resulting from the use thereof on a solid substrate.

Thus, 10.2 parts of a toluene solution containing 49.0% by weight of the random interpolymer described in Example XIV hereinabove, were mixed with 49.8 parts of toluene and 40.0 parts of a finely divided, photoconductive zinc oxide. (1:1 mixture of St. Joe #325-PC and 340-PC, St. Joseph Lead Co.) The resulting suspension was subjected to grinding in a porcelain ball mill for a period of 3 hours so as to reduce the particle size of the mixture to within the range of from 4.5 to 5.5 on the Hegman scale. Thereafter, 0.9 part, by weight, of a dye sensitizer mixture comprising 1%, by weight, of disodium fluorescein, 1%, by weight, of bromophenol blue and 1%, by weight, of erichrome black dissolved in methanol were intimately dispersed in the mix.

The resulting photoconductive coating system, which had a total solids content of 45%, by weight, was then subjected to the "Charge Acceptance," "Dark Decay Rate" and "Light Decay" tests as described hereinabove, wherein it exhibited a charge acceptance of 470 volts, a dark decay rate of 5 volts/second and a light decay angle of 80° as compared to a commercial photoconductive coating system which had a charge acceptance of 390 volts, a dark decay rate of 9 volts/second and a light decay angle of 75°.

These results clearly indicate that this photoconductive coating system has the capability of accepting substantially more charge, retaining more of the accepted charge for a period of time sufficient to fix an image created thereon and discharging the charge faster on exposure to light than the corresponding commercial photoconductive system.

EXAMPLE XVII

This example illustrates the preparation of additional random interpolymers (A to O) used as binders in the photoconductive coating systems typical of the novel compositions of this invention. The syntheses are summarized in Table II. The following abbreviations are used:

St—Styrene      MEM—Monoethyl maleate
DBF—Dibutyl fumarate      VA—Vinyl acetate
DBM—Dibutyl maleate      EA—Ethyl acrylate
MBM—Monobutyl maleate Each of the resulting bromine containing interpolymers as well as the control commercial polymer system which contains styrene, dibutyl fumarate and mono-butyl maleate was tested as a binder in a photoconductive coating composition containing the same ingredients as described in Example XVI except that different zinc oxide (Green Seal 8 supplied by the New Jersey Zinc Co.) was used. The pigment to resin solids ratio was maintained at 8:1 in all cases, and all electrical measurements were carried out in a controlled room maintained at 50% relative humidity at 25° C. in Table III the results obtained upon subjecting the above photoconductive coating composition to the "Charge Acceptance," "Dark Decay Rate" and "Light Decay Rate" test procedures described hereinabove are summarized.

trical properties. As a matter of fact other electrical properties such as, dark decay rate and light decay rate, are improved. High charge acceptance will allow cutting down the coating weight of paper maintaining the charge acceptance of the coated paper at the same level as current commerical paper.

In summary, this invention provides novel bromine-containing monomers and novel and improved polymeric binders for electrophotographic compositions derived from these monomers.

Variations may be made in materials, proportions, and procedures without departing from the scope of this invention.

TABLE II

| | Interpolymers | | | | | | | | | | | | | | |
|---|---|---|---|---|---|---|---|---|---|---|---|---|---|---|---|
| | A | B | C | D | E | F | G | H | I | J | K | L | M | N | O |
| Ingredients: | | | | | | | | | | | | | | | |
| ST (parts) | 33.8 | 67.6 | 67.6 | 33.8 | 67.6 | 33.8 | 67.6 | 13.5 | 67.6 | 91 | | | 33.8 | 33.8 | 20.8 |
| DBF (parts) | 42.8 | 85.5 | 85.5 | 42.7 | 85.5 | 38.5 | 85.5 | 17.1 | 85.5 | 85.5 | | | 28.5 | 42.8 | |
| DBM (parts) | | | | | | | | | | | 11.5 | | | | |
| MBM (parts) | 5.4 | | 10.8 | | | 10.8 | 7.7 | 2.4 | | | | | 10.8 | | |
| MEM (parts) | | | | | | | | | | | | | | 5.3 | |
| Monomer of Example: | | | | | | | | | | | | | | | |
| VIII (parts) | | 27.9 | | | | | | | | | | | | | |
| X (parts) | | | 19.7 | 19.7 | | | | | | | | | | | |
| XIII (parts) | | | | | | | | 16.7 | | | | | | | |
| V (parts) | | | | | 39.3 | | | | | | | | | | |
| IV (parts) | 16.0 | | | | | | | | | | | | | | |
| II (parts) | | | | | | | | | | | 21.3 | 18.0 | | 16.1 | 30.1 |
| XI (parts) | | | | | | | | | | | | | 17.9 | | |
| IX (parts) | | | | | | 12.1 | | | | | | | | | |
| VII (parts) | | | | | | | | 7.4 | | | | | | | |
| XIV (parts) | | | | | | | | | 52.5 | 51.3 | | | | | |
| VA (parts) | | | | | | | | | | | 33.5 | | | | |
| EA (parts) | | | | | | | | | | | | 46.9 | | | |
| Solvent[1] (parts) | 98.0 | 181.0 | 183.6 | 96.2 | 192.4 | 95.2 | 177.5 | 40.2 | 205.6 | 227.8 | 80.5 | 65.9 | 91.0 | 98 | 88.1 |
| Benzoyl peroxide (parts) | 3.0 | 5.4 | 5.5 | 2.9 | 5.7 | 2.8 | 5.4 | 1.2 | 6.16 | 6.81 | 0.66 | 0.66 | [2] 0.68 | 2.93 | |
| Temperature, °C | 85–90 | 85–90 | 85–90 | 85–90 | 85–90 | 85–90 | 85–90 | 95–90 | 85–90 | 85–90 | 72–76 | 72–76 | 85–90 | 85–90 | 85–90 |
| Time (hours) | 6.3 | 6.0 | 6.0 | 6.0 | 3.5 | 5.0 | 5.9 | 5.5 | 7½ | 7 | 7 | 5½ | 5.5 | 6 | 6 |
| Percent conversion | 95.7 | 98.7 | 100.0 | 100.0 | 92.0 | 95.0 | 97.8 | 100 | 97.6 | 97.3 | 90 | 96 | 98 | 98.2 | 100 |
| Percent bromine | 7.3 | 5.4 | 5.4 | 10.4 | 10.4 | 5.3 | 3.6 | 9.9 | 9.6 | 8.3 | 17.1 | 13.7 | 11.0 | 8.9 | 29 |
| Acid number | 33.8 | 38.7 | 38.2 | 36.4 | 36.5 | 37.1 | 14.1 | 33.8 | 34.1 | | 30 | 26.9 | 38.7 | 36.7 | 51.4 |
| I.V. (dl./g.) in toluene | 0.09 | 0.11 | 0.07 | 0.07 | 0.11 | 0.11 | 0.12 | 0.11 | 0.12 | 0.11 | 0.14 | 0.14 | 0.08 | 0.09 | 0.10 |

[1] Toluene was the solvent in all cases except K and O; in K a mixture of ethyl acetate (14.5 parts) and toluene (66.5 parts) was used; in O a mixture of ethyl acetate (15 parts) and toluene (73.1 parts) was used.
[2] t-Butyl peroctoate was used instead of benzoyl peroxide.

TABLE III

| Interpolymer | Charge acceptance (volts) | Dark decay rate (volts/sec.) | Light decay rate (angular degrees) |
|---|---|---|---|
| A | 400 | 10 | 80 |
| G | 380 | 5 | 80 |
| H | 420 | 3 | 85 |
| Control | 350 | 12 | 70 |
| B | 480 | 8 | 85 |
| C | 440 | 7 | 85 |
| D | 440 | 6 | 80 |
| Control | 380 | 10 | 75 |
| E | 430 | 8 | 80 |
| Control | 370 | 10 | 75 |
| F | 460 | 8 | 80 |
| Control | 380 | 10 | 75 |
| I | 500 | 5 | 83 |
| J | 490 | 6 | 85 |
| Control | 420 | 10 | 70 |
| K | 550 | 10 | 75 |
| N | 580 | 6 | 80 |
| Control | 500 | 12 | 60 |
| M | 400 | 10 | 76 |
| Control | 350 | 12 | 60 |

EXAMPLE XVIII

This example shows the preparation of a random interpolymer containing 4-bromostyrene, dibutyl fumarate, monobutyl maleate, and styrene.

A polymer was prepared by the procedure of Example XV using a charge of 4-bromostyrene (14.2 parts), dibutyl fumarate (42.75 parts), monobutyl maleate (10.75 parts), and styrene (26.7 parts). The polymerization was carried out at 85–90° C. for 6 hours and yielded a polymer having an acid number of 37.3 and an intrinsic viscosity of 0.11 and containing 6.6% bromine. When tested as in Example XVII, the polymer of this example exhibited properties superior to the control of Example XVII.

From the above results it is observed that all these bromine containing interpolymer systems offer excellent charge acceptance without affecting adversely other electrical properties.

What is claimed is:

1. A bromine-containing, film forming interpolymer consisting essentially of residues derived from at least one bromine-containing monomer selected from the group of compounds corresponding to the general formulas (a) 
$$\begin{array}{c} CH-COO-CH_2-C=CH-Br \\ \parallel \quad\quad\quad\quad\quad\quad\quad | \\ CH-COO-Y \quad\quad Br \end{array}$$

(b) 
Br-[benzene ring with 2 Br substituents]-COO-$R_1$
    -COO-$CH_2$-$CH(R_1)$-O-C(=O)-CH=CH-COOH (c) 
Br-[benzene ring with Br]-O-$CH_2$-$CH(R_1)$-O-C(=O)-CH=CH-COOH (d) 
Br-[benzene ring with 2 Br]-O-$CH_2$-$CH(R_1)$-O-C(=O)-CH=CH-COOH wherein
$R_1$=H, or —$CH_3$
$R_2$=alkyl radical having 1 to 4 carbon atoms, and $$Y=H, \text{ or } -CH_2-C=CH-Br$$
$$\quad\quad\quad\quad\quad\quad | $$
$$\quad\quad\quad\quad\quad\quad Br$$

at least one ethylenically unsaturated monomer which does not contain bromine.

2. A bromine-containing, film forming interpolymer consisting essentially of residues from at least one bromine-containing monomer selected from the group consisting of compounds corresponding to the general formulas (a) 
$$\begin{array}{c} CH-COO-CH_2-C=CH-Br \\ \parallel \quad\quad\quad\quad\quad\quad\quad | \\ CH-COO-Y \quad\quad Br \end{array}$$

(b) 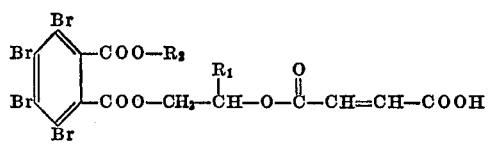

(c) 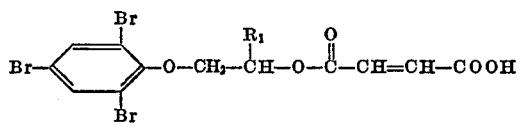

(d) 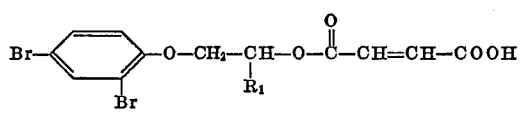

(e)  CH—COO—CH₂—CH—R₃
     ‖
     CH—COO—X      Br wherein:
R₁=H, or CH₃,
R₂=alkyl radical having 1 to 4 carbon atoms,
R₃=H, CH₃, or —CH₂Br X=H, or —CH₂—CH—R₁
              |
              Br Y=H, or —CH₂—C=CH—Br
              |
              Br and at least one ethylenically unsaturated monomer which does not contain bromine selected from the group of compounds corresponding to the general formula

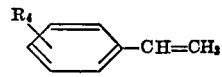

wherein: R₄=H, Cl, or t-butyl.

3. A bromine-containing, film forming interpolymer consisting essentially of residues of 2,3-dibromoallyl maleate, styrene, and dibutyl fumarate in the proportions by weight of 39.3/67.6/85.5, respectively.

References Cited
FOREIGN PATENTS
1,094,723   12/67   Great Britain _____ 260—485 H JOSEPH L. SCHOFER, Primary Examiner
C. A. HENDERSON, JR., Assistant Examiner U.S. Cl. X.R.
96—1.5; 117—121; 260—78.5 B, 78.5 UA